United States Patent
Pope et al.

(10) Patent No.: US 10,433,377 B2
(45) Date of Patent: Oct. 1, 2019

(54) CONTROL CIRCUIT FOR MODULATING AN ANALOG DIMMING COMMAND SIGNAL

(71) Applicant: CREE, INC., Durham, NC (US)

(72) Inventors: Daniel Pope, Morrisville, NC (US); Jun Zhang, Cary, NC (US); Michael B. Gilliom, Raleigh, NC (US)

(73) Assignee: IDEAL INDUSTRIES LIGHTING LLC, Durham, NC (US)

( * ) Notice: Subject to any disclaimer, the term of this patent is extended or adjusted under 35 U.S.C. 154(b) by 0 days.

(21) Appl. No.: 15/911,953

(22) Filed: Mar. 5, 2018

(65) Prior Publication Data

US 2018/0199405 A1    Jul. 12, 2018

Related U.S. Application Data

(62) Division of application No. 14/789,520, filed on Jul. 1, 2015, now Pat. No. 9,913,327.

(51) Int. Cl.
    H05B 33/08    (2006.01)
    H05B 37/02    (2006.01)

(52) U.S. Cl.
    CPC ....... *H05B 33/0815* (2013.01); *H05B 33/086* (2013.01); *H05B 33/0845* (2013.01); *H05B 37/0218* (2013.01); *H05B 37/0227* (2013.01); *H05B 37/0254* (2013.01); *Y02B 20/46* (2013.01)

(58) Field of Classification Search
    CPC ................ H05B 37/02; H05B 37/0218; H05B 37/0227; H05B 37/0254; H05B 333/08; H05B 333/0815; H05B 333/0845; H05B 333/086; Y02B 20/46

USPC .... 315/209 R, 210, 276, 291, 307, 308, 312
See application file for complete search history.

(56) References Cited

U.S. PATENT DOCUMENTS

| | | | |
|---|---|---|---|
| 2009/0174338 A1* | 7/2009 | Muramatsu | H05B 33/0818 315/250 |
| 2010/0102747 A1 | 4/2010 | Ilyes et al. | |
| 2011/0140611 A1 | 6/2011 | Elek et al. | |
| 2011/0181200 A1 | 7/2011 | Luk et al. | |
| 2013/0065642 A1 | 3/2013 | Liu et al. | |
| 2014/0300294 A1* | 10/2014 | Zampini, II | H05B 33/0857 315/297 |

OTHER PUBLICATIONS

International Search Report and Written Opinion issued for PCT/US2016/040504 dated Oct. 11, 2016, 13 pages.

* cited by examiner

*Primary Examiner* — Jimmy T Vu

(74) *Attorney, Agent, or Firm* — Coats & Bennett, PLLC

(57) ABSTRACT

An LED lighting device comprises at least one LED selectively energizable to develop light and a control circuit coupled to the LED that develops a command signal comprising first and second command signal components for controlling the at least one LED to cause the LED to develop light comprising a desired brightness in response to the first command signal component. The control circuit controls the at least one LED to cause the LED to develop light comprising a further desired parameter magnitude other than desired brightness in response to the second command signal component, and the first signal component comprises an IEC 0-10 volt analog lighting control.

18 Claims, 12 Drawing Sheets

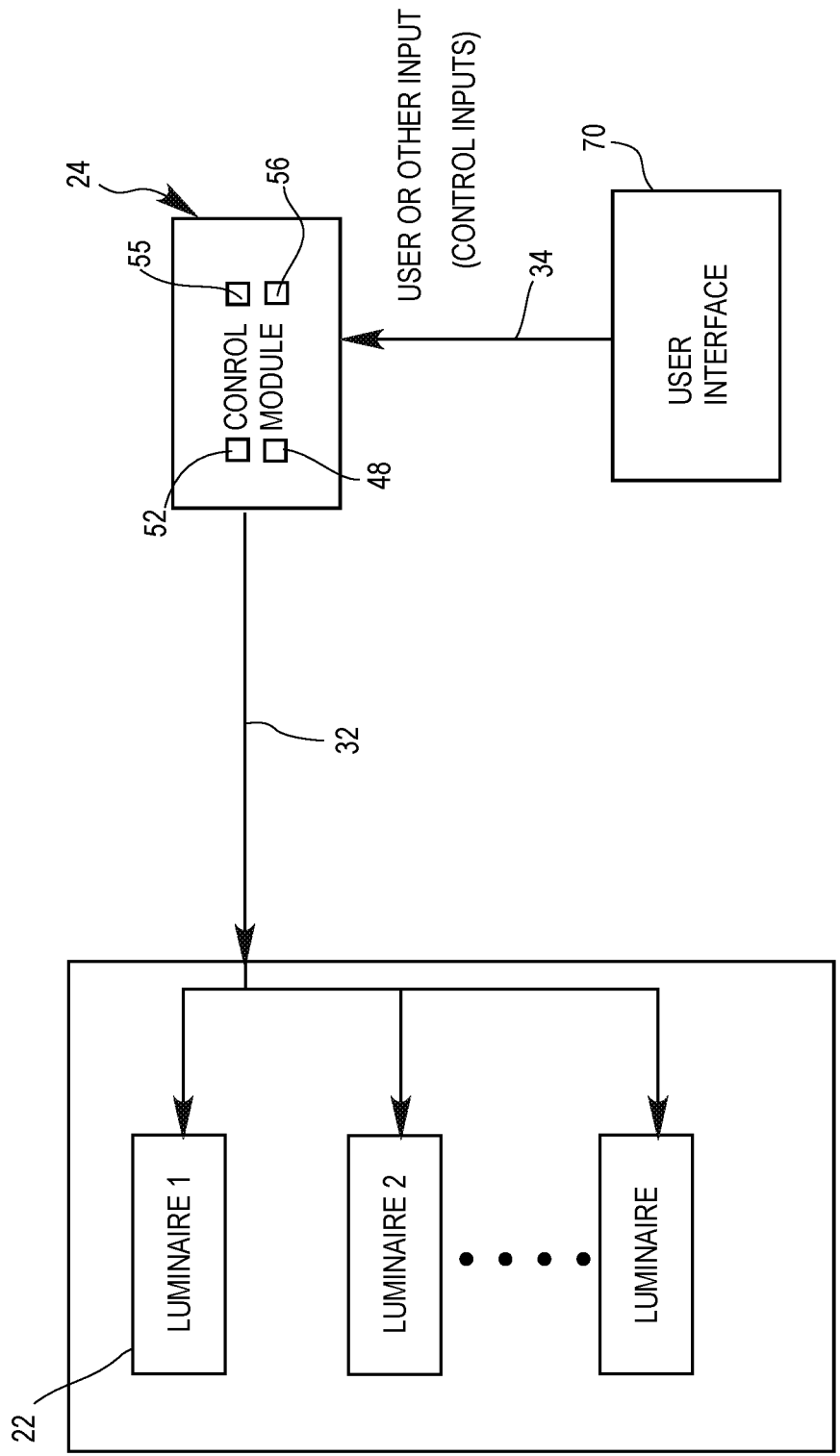

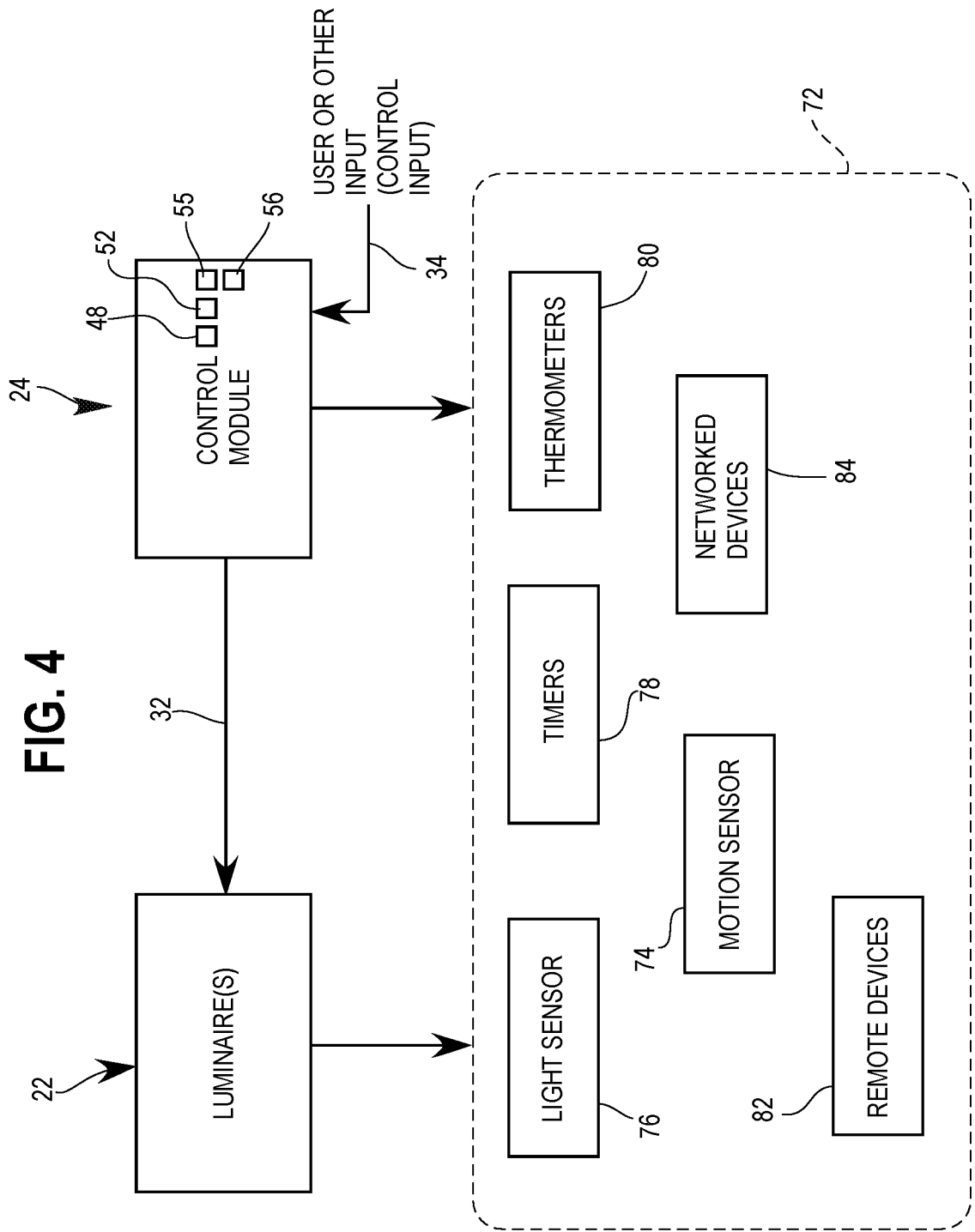

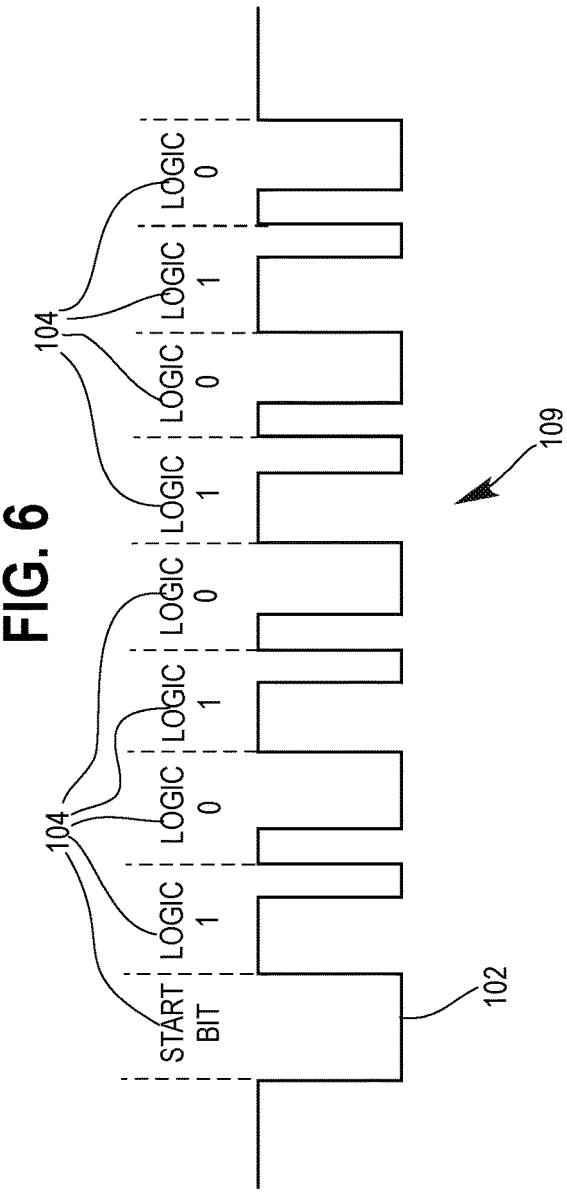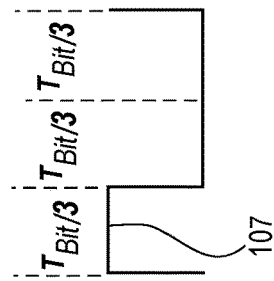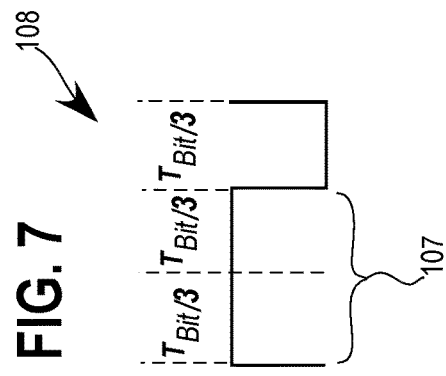

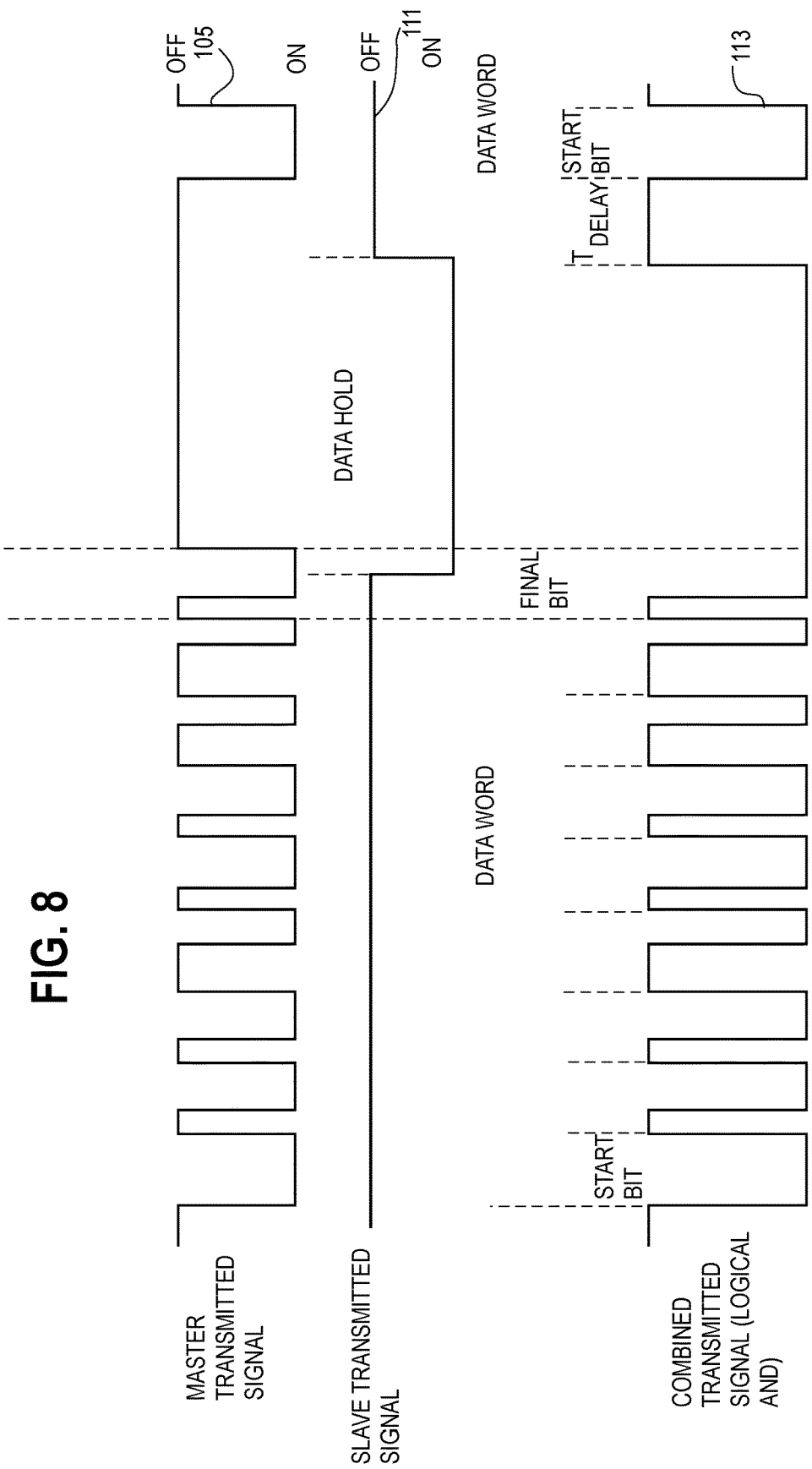

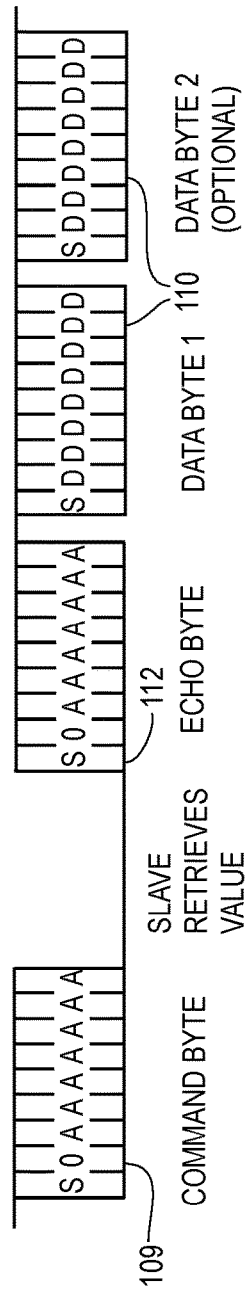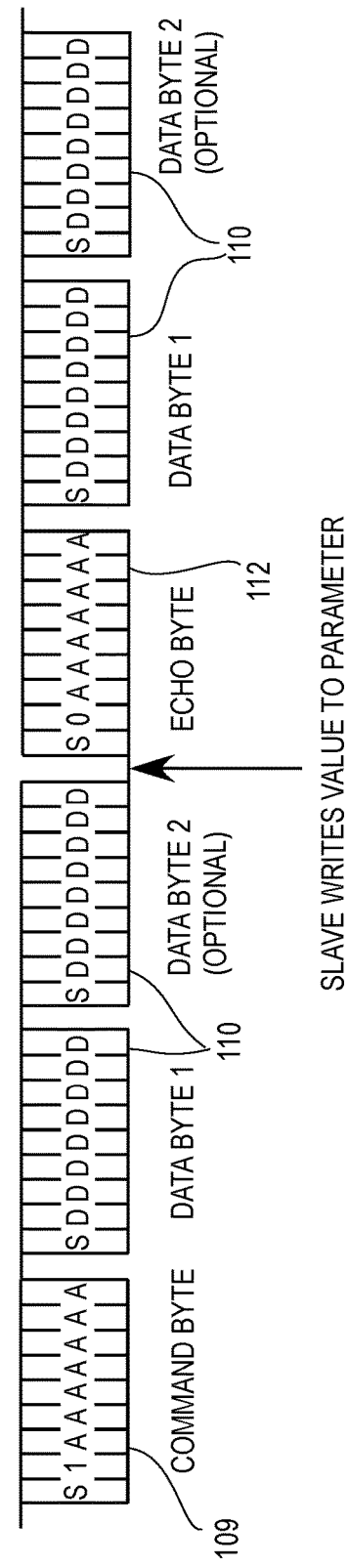

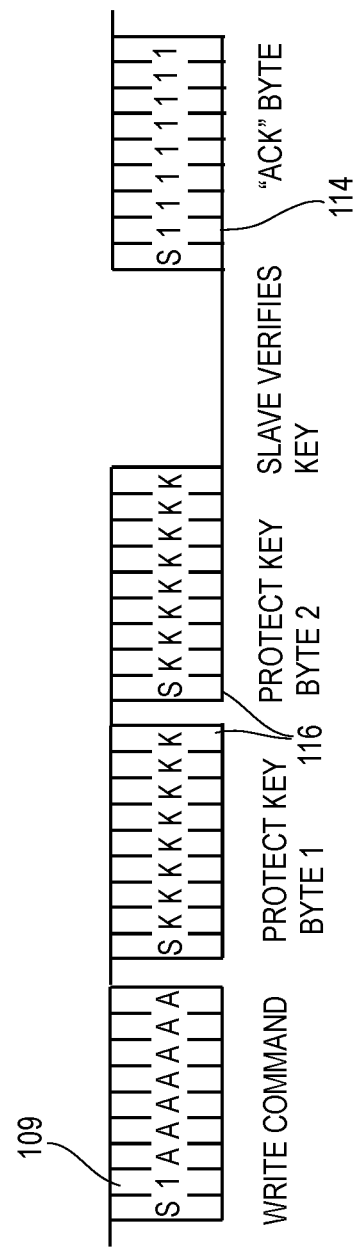

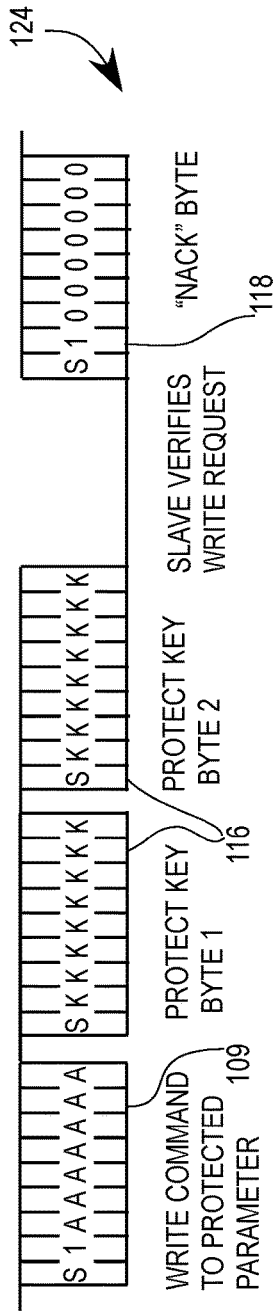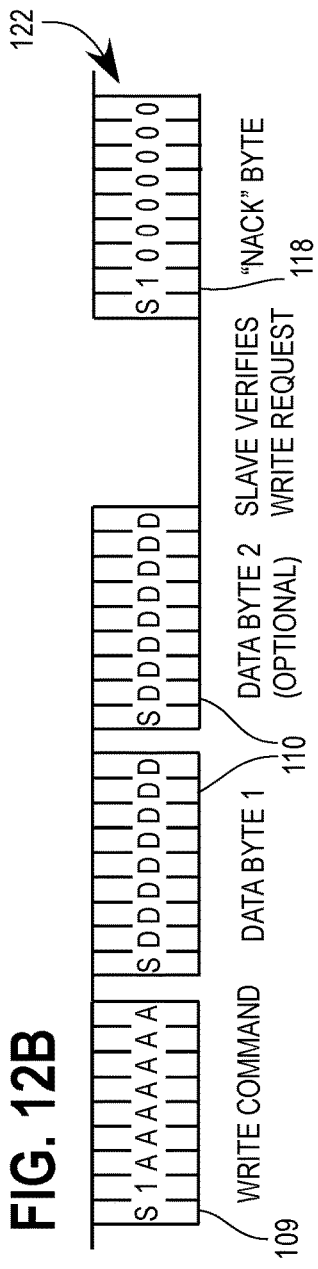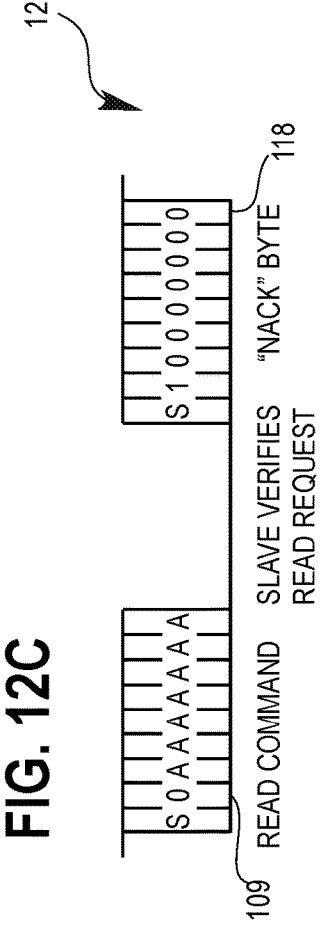

CONTROL CIRCUIT FOR MODULATING AN ANALOG DIMMING COMMAND SIGNAL

CROSS REFERENCE TO RELATED APPLICATIONS

The present application claims the benefit of and comprises a divisional of U.S. patent application Ser. No. 14/789,520 filed on Jul. 1, 2015, entitled "Control Circuit for Modulating an Analog Dimming Command Signal", the entire disclosure of which is hereby incorporated by reference herein.

FIELD OF DISCLOSURE

The present subject matter relates to control circuits, and more particularly, to control circuits for luminaires.

BACKGROUND

Often, it is desirable to control the brightness of LED luminaires. Some LED luminaire drivers have been designed to provide variable power to LEDs to obtain a dimming effect. Such drivers may provide variable power in response to a user input or according to a predetermined schedule that is implemented by a controller. In known designs for driving one or more LEDs in a dimmable manner, the lamp driver receives power from a power supply (such as residential or commercial power supplied by an electric utility) to power circuit element(s) that develop a driving current.

Different methods for controlling the brightness of an LED luminaire may be employed. One such method for dimming uses the IEC (i.e., the International Electrotechnical Commission) 0-10V analog lighting control protocol (IEC standard 60929, Annex E, entitled "Control Interface for Controllable Ballasts" (© IEC:2006)). The 0-10V analog lighting control protocol specifies a direct current (DC) voltage level between about zero volts and about 10 volts as a control signal. The voltage level corresponds to an amount of dimming to be applied to the controlled LED luminaire. Furthermore, there are several variations of the IEC protocol. These variations arise with respect to how current is sourced and the voltage range utilized for the control signal.

The voltage level provided as a control signal is only capable of controlling one parameter of the controlled luminaire, namely dimming level. The implications of this characteristic on a lighting system of lower complexity, e.g. having only a handful of controlled luminaires, may seem unrestrictive. However, as lighting systems grow in complexity such systems may require a supervisory controller and multiple intermediate control modules for developing control signals. In addition to the complexity of various interconnection schemes, wiring for more sophisticated systems may require expensive and difficult to use components, such as multi-wire cables, specialized connectors, large junction boxes, and the like.

The requirement that, at some branch in the control scheme, a hardwired connection is necessary to deliver each voltage level eventually limits the practicality of the 0-10V analog lighting control protocol. Further complications arise when this limitation, namely that each voltage level used for control must be transmitted by a dedicated hardwired connection from a supervisory controller, is combined with the limitation that only dimming level may be controlled. Therefore, a need exists for a control scheme capable of communicating additional control through the existing hardware of a system utilizing the 0-10V analog lighting control protocol.

With advent of luminaires that incorporate programmable elements, there arises the capability to control luminaires in more flexible ways. One could, for example, command one or more luminaires to adjust color temperature or hue, display one or more scenes, implement scheduled lighting conditions, and the like. Such commands could be developed and transmitted using a dimmer that implements the IEC standard noted above, but this would undesirably eliminate the standard dimming capability and render the dimmer unsuitable for non-LED light sources. An alternative is to retain the conventional dimmer and dimming capability and add additional conductors and/or communication channels to provide paths for the additional commands. Such an approach undesirably adds cost and complexity to the resulting lighting system.

SUMMARY

According to one aspect, a control for an LED luminaire includes a dimming control circuit that develops an analog dimming command signal, which is variable between zero volts and ten volts, to command LED brightness and a modulation circuit coupled to the dimming control circuit. The modulation circuit modifies the analog dimming command signal to include digital data for commanding a parameter of LED operation other than LED brightness.

According to another aspect, a control system for an LED luminaire includes a dimming control circuit that manipulates the voltage level of a 0-10V analog dimming command signal to command LED brightness and a modulation circuit coupled to the dimming control circuit. The modulation circuit modifies the 0-10V analog dimming command signal to include digital data for commanding a parameter of LED operation.

According to yet another aspect, a system for controlling an LED luminaire based on a 0-10V analog lighting control protocol includes a module configured to develop an analog dimming command signal for commanding LED brightness and a module configured to modify the analog dimming command signal. The module configured to modify the analog dimming command signal modifies the signal to include digital data for commanding a parameter of LED operation other than LED brightness.

Other aspects and advantages will become apparent upon consideration of the following detailed description and the attached drawings wherein like numerals designate like structures throughout the specification.

BRIEF DESCRIPTION OF THE DRAWINGS

FIG. 3 is a block diagram of an alternative embodiment of a lighting system;

FIG. 4 is a block diagram of an alternative embodiment of a lighting system;

FIG. 6 is a waveform diagram illustrating an example of an encoding scheme of a single byte;

FIG. 7 is a waveform diagram illustrating bit timing to encode a logical one in the encoding scheme example of FIG. 6;

FIG. 7A is a waveform diagram illustrating bit timing to encode a logical zero in the encoding scheme example of FIG. 6;

FIG. 8 is a waveform diagram of an exemplary data hold protocol;

FIG. 9 is a diagram of an exemplary data read command and response;

FIG. 10 is a diagram of an exemplary data write command and response;

FIG. 11 is a diagram of an exemplary protected write command and acknowledgement response;

FIG. 12A is a diagram of an exemplary no acknowledgement response to a write command to a protected parameter;

FIG. 12B is a diagram of an exemplary no acknowledgement response to a write command;

FIG. 12C is a diagram of an exemplary no acknowledgement response to a read command;

DETAILED DESCRIPTION

Figure 1:
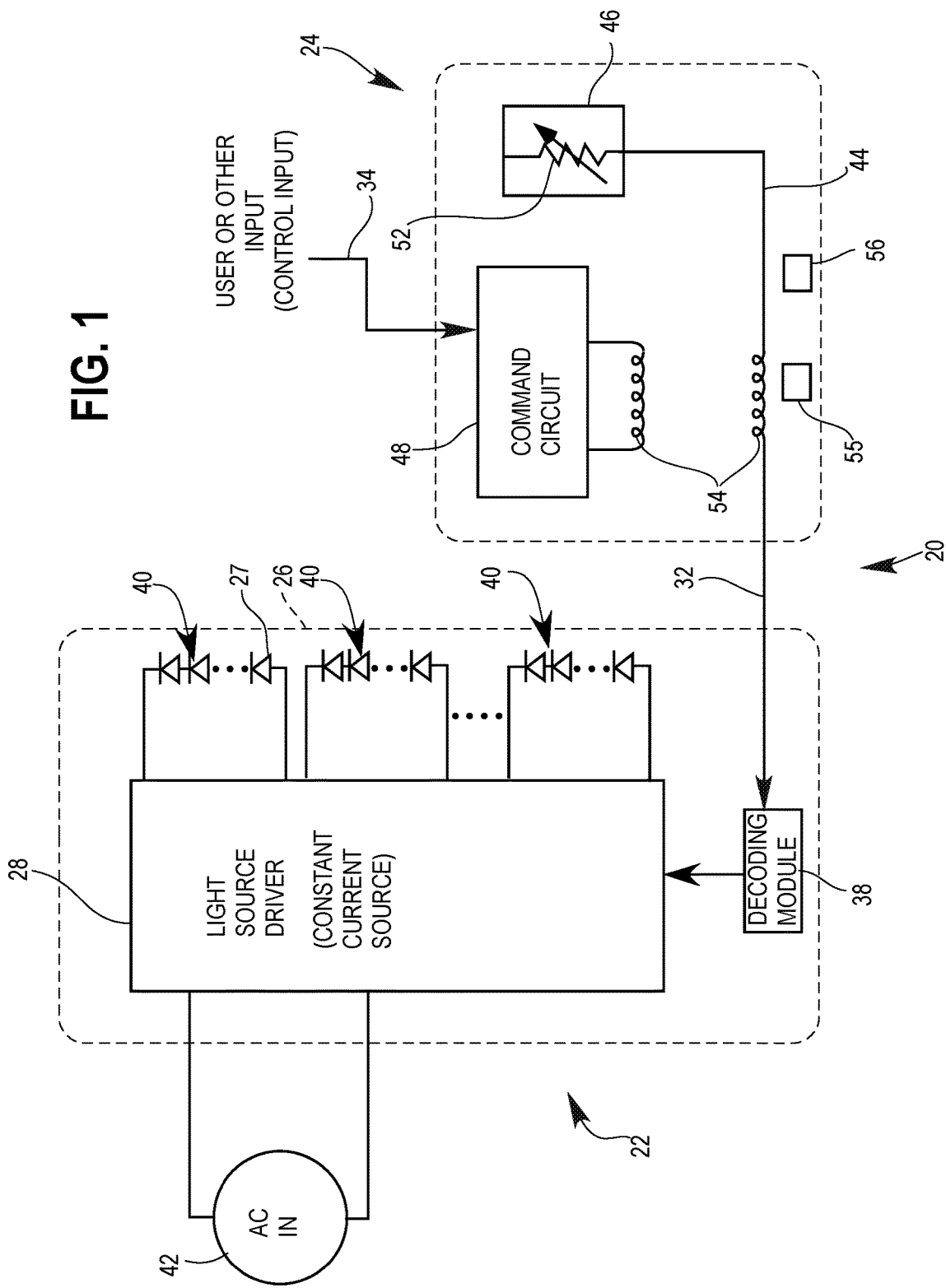
FIG. 1 is a combined block and schematic diagram of a lighting system.

Referring now to FIG. 1, the present disclosure contemplates the control of a lighting system 20 comprising one or more luminaires 22 and one or more circuits, shown as a control module 24, for controlling same. Each luminaire 22 may be of any suitable size and/or shape and/or may be adapted for mounting in a ceiling, wall or other surface, or may be free-standing. In the illustrated embodiment, each luminaire 22 includes both electrical components and at least one light source 26, although the electrical components and the light source(s) may be disposed in different locations. The light source(s) 26 in each luminaire 22 may include any number of lighting elements, which may comprise LEDs 27, one or more fluorescent bulbs or tubes, or any other light source that uses the IEC standard for dimming control as identified above.

In the following description, the lighting system 20 is illustrated as including one control module 24 that controls a single luminaire 22, although more than one control module 24 and/or more than one luminaire 22 may be included therein. Additionally, the figures described hereafter depict LEDs as the light source 26.

Referring to FIG. 1, the lighting system 20 further includes a driver circuit 28 for powering the luminaire 22. The control module 24 is in communication with the luminaire 22 and may effect changes in light source operation either through the driver circuit 28 or other control mechanisms of the luminaire 22, such as a microcontroller 30 shown in FIG. 2, and/or one or more alternative or additional devices, programmable or not programmable, associated with, and, in some embodiments, integral to, the luminaire 22. Communication is achieved by an electrical connection 32 such as a wire and/or wireless communication and may consist of one or both of analog and digital signals. Specifically, while the embodiment shown in FIG. 1 depicts only one electrical connection 32 between the control module 24 and the luminaire 22, alternative embodiments may utilize any number of electrical connections for transmission of either analog or digital signals, or both, to the luminaire 22 from the control module 24. Additional electrical connections, such as back-up connections, power connections, and secondary communications connections (not shown), may be provided between the control module 24 and the luminaire 22. Further electrical connections may exist between the lighting system 20 and other electrical components and/or systems. For example, a control input signal may be developed on a line 34 by either a user operating a device or a programmable signal source, as is shown in FIG. 1.

In the embodiment shown in FIG. 1, the luminaire 22 further includes a decoding module 38. The light source shown in FIG. 1 comprises one or more series of strings 40 of LEDs and each string 40 contains one or more LEDs 27. The strings 40 may all have the same number of LEDs 27 or different numbers of LEDs 27. Multiple LEDs of each string are preferably connected together in series, although parallel or combined series- and parallel-connected LEDs could be used. The luminaire 22 receives control signals from the control module 24 and power from an AC power supply 42. The power may be received from a residential or commercial power supply provided by an electric utility and is used to power the driver circuit 28.

According to another aspect of the embodiment shown in FIG. 1, the luminaire 22 is responsive to an analog dimming command signal on a line 44 that is variable within a predetermined control range, typically between about zero and about 10 volts. The luminaire 22 includes a circuit responsive to the magnitude of the dimming command signal 44 within the determined control range to develop a constant current magnitude and a luminaire control voltage magnitude that cause the luminaire to operate at a commanded brightness level.

Again referring to the embodiment of FIG. 1, the control module 24 includes dimming control circuitry 46 that develops the analog dimming command signal on the line 44 according to the above described IEC 0-10V analog lighting control protocol as well as digital command circuitry 48 for injecting or impressing digital data onto the analog dimming command signal 44. The dimming control circuitry 46 includes a variable resistor (i.e., potentiometer) 52 that receives the constant current magnitude and develops the dimming command signal in response to receipt of the constant current magnitude according to a setting of the variable resistor. This setting may be manual e.g., using a manually-operable slide switch or rotary knob, or the setting may be determined and implemented by a programmable device, as noted above. The digital command circuitry 48 includes modulation circuitry 54 that impresses or encodes the digital data on the analog dimming command signal line 44.

The modulation circuitry 54 included in the embodiment shown in FIG. 1 may include mutually coupled inductors or a transformer to amplitude modulate the analog dimming command signal on the line 44 with the digital data. This preferably results in binary encoded digital signals being impressed on the analog dimming control signal, although other modulation and/or encoding schemes may be used as should be evident to one of ordinary skill in the art. Different modulation approaches may necessitate different modulation circuitry 54 and different coupling of the modulation circuitry 54 to the dimming control circuitry 46. Ideally, the modulation should not result in a DC value change of the dimming command signal so that the analog dimming command signal can be properly interpreted by the driver circuit 28. The modulation and encoding approaches contemplated herein are generally well known by those skilled in the art and will not be further detailed herein.

The digital data may be extracted from the modulated dimming command signal, decoded (if necessary), and used to control and/or communicate with one or more luminaire(s). For example, the digital data may be transmitted unidirectionally from the control module 24 to the microcontroller 30 to control same. Because only unidirectional communications are undertaken in such an embodiment, no bus arbitration is required. However, more complex alternative embodiments may include two-way communication between at least two devices, such as between the control module 24 and the luminaire 22 or between at least two luminaires or at least two control modules similar or identical to the control module 24. Two-way communication may require additional decoding circuitry. For example, in the illustrated embodiment of FIG. 2, a decoding module 55 may be provided in the control module 24 so that communications sent from the luminaire 22 (e.g., as developed by the microcontroller 30) to the control module 24 may be received and interpreted. The interpretation of communications received at the control module 24 may be performed by a further microcontroller 56 and/or additional and/or alternative suitable devices, whether programmable or not programmable or a combination of the two, and capable of at least receiving digital instructions. In general, alternative embodiments are contemplated wherein unidirectional or bidirectional luminaire-to-luminaire, luminaire-to-dimmer, and/or luminaire-to-other device control and/or communications for any purpose are implemented.

The microcontroller 30 may operate the luminaire 20 as well as other luminaires, if any, in response to the digital data via the driver circuit 28 in a manner to control one or more operating parameters thereof other than light dimming, such as color temperature (CCT), to display scenes, to implement scheduled commands, to control displayed hue, to cause flashing and/or steady illumination of one or more luminaires, to coordinate operation of at least two luminaires, to cause at least one luminaire to turn on upon sensing, and/or to enable communication between luminaires, communication between one or more luminaires and one or more other devices, such as the control module 24, updating or other programming modification of the microcontroller 30 or any other device, etc. The microcontroller 30 may be instructed to control a dimming card or a piece of test equipment. The digital data may be application oriented, such as a light dimming command, or it may be relevant to the commissioning of the light, such as a tuning instruction.

Another alternative embodiment comprehends the elimination of the hardwired connection 32 altogether and use of a wireless connection for control and/or communication, with or without the dimming control function, in which case unidirectional or bidirectional communication circuits are provided in the luminaire 22 and the control module 24 (or another device remote from the luminaire 22).

Figure 2:
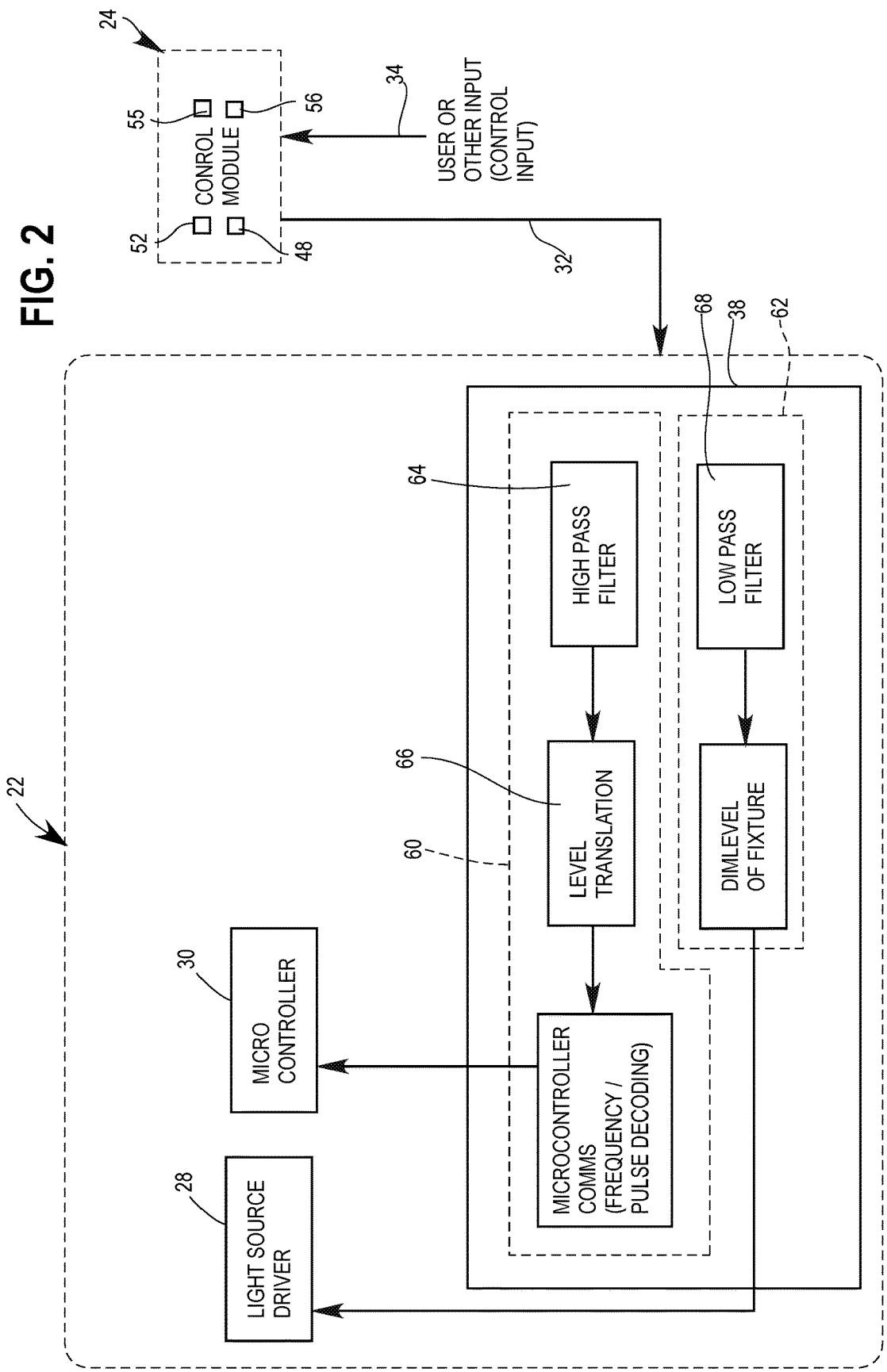
FIG. 2 is a block diagram of a lighting system including control signal extraction components.

Referring to FIG. 2, the decoding module 38 interprets the communications received from the control module 24. In the illustrated embodiment, the decoding module 38 includes first and second demodulation circuits or modules 60, 62 for extracting the digital data and the analog dimming command signal that are transmitted in combined form over the line 32. Specifically, a signal representing the impressed digital data is extracted from the signal transmitted over the line 32 by a high pass filter 64 and a level translator 66. The digital data can then be decoded for use by the microcontroller 30. The signal on the line 32 is likewise processed by a low pass filter 68 in the second demodulation module 62 to remove the high frequency components so that the commanded dimming level for the light source 26 is determined and the driver circuit 28 is operated in accordance with such command.

In alternative embodiments, the demodulation circuitry 60 may be modified to accommodate the selected method of modulation and its associated protocols. Demodulation circuitry 60 for extracting the digital data may be analog or digital or a combination of both and may be implemented by one or more of a microcontroller, a digital signal processor (DSP), a field programmable gate array (FPGA), an application-specific circuit (ASIC), or any other suitable device(s). A preferred modulation protocol may be selected for any number of reasons including reliability and economy of both the modulation circuitry 54 and demodulation circuitry 60. For example, amplitude modulation/demodulation, frequency modulation/demodulation, phase modulation/demodulation, pulse amplitude modulation/demodulation, or any other modulation/demodulation techniques could be employed. Preferably, a modulation protocol is used that is highly compatible with the microcontroller 30. Data can be multiplexed, transmitted, and demultiplexed, such as by time division multiplexing/demultiplexing, or any other technique, to permit multiple commands to be transmitted and decoded.

Advantages are realized if the 0-10V analog lighting control protocol is preserved and the luminaire 22 is capable of interpreting both digital and analog control signals as noted above. These advantages include retaining 0-10V standard dimming control and allowing non-LED lamps to be operated by the control module 24. A further advantage is that a signal injection device can be used in conjunction with a conventional dimmer so that dimming control is preserved while gaining the ability to communicate and/or control one or more parameters other than luminaire brightness. According to an aspect a device is contemplated that includes both a circuit for developing an analog dimming command signal and modulation circuitry for impressing the digital data signal on the analog dimming command signal wherein both circuits are housed together and utilize the same hardwired electrical connection to one or more luminaires. While the embodiments described herein focus on a configuration wherein the IEC 0-10V analog light control protocol and the transmission of digital data are executed simultaneously, a further alternative embodiment is contemplated such that in a first control mode only the IEC 0-10V analog lighting control protocol is utilized and in a second control mode only digital data is transmitted.

FIG. 3 illustrates an embodiment in which the control module 24 shown in FIGS. 1 and 2 provides control signals to a plurality of luminaires 22. In the illustrated embodiment the luminaires are dimmed together in accordance with the dimming control methodology described hereinabove in connection with FIGS. 1 and 2, although this need not be the case. Thus, for example, one or more (or even all) of the luminaires 22 may not be dimmed by the control module 24, whereas the remaining luminaires 22 (if any) are dimmable as described above (either together or separately) or some or all of the luminaires 22 may be dimmable using a different methodology than that described previously. In general, the control input 34, including user input or other input such as from a programmed controller, is customized to suit the number and configuration of the components included in the lighting system 20 and the desired dimming operation thereof. In addition, a user interface 70 may be included that allows a user to provide other input commands to the control module 24 to operate the luminaires 22 in a desired fashion other than in one or more dimming modes/levels. The user interface 70 may include a fully customizable graphical user interface (GUI) and/or physical buttons or other devices (preferably, only a small number of physical buttons or other devices are included) for controlling the development of digital data to be impressed on the analog dimming command signal that may be developed by the control module 24.

In embodiments, the appropriate user interface 70 may depend on the complexity of the control performed by the digital data. The appropriate user interface 70 may take into further consideration aesthetic and design considerations with respect to the placement and usability of the user interface within the environment surrounding the lighting system 20. The user interfaces 70 for manipulating the analog dimming command signal and the digital data impressed thereon may be fully integrated or entirely separate. A further alternative embodiment contemplates having both dimming control circuitry 46 and digital command circuitry 48 together with a user interface 70 housed within the same control module 24, although this need not be the case.

Referring now to FIG. 4, further alternative embodiments contemplate communication connections other than or in addition to that between the control module 24 and each luminaire 22. For example, communications may be implemented between the control module 24 and the luminaire 22 as well as between the luminaire 22 and other luminaires. It is not only advantageous for the control module to be able to communicate with the microcontroller 30 of each luminaire 22, but also for the microcontroller 30 of each luminaire 22 to be able to communicate with other luminaires so that coordinated operation can be realized and/or programming modifications, such as updates can be shared.

Again referring to FIG. 4, a further alternative embodiment includes communications connections to other electrical devices 72 in the environment surrounding the lighting system 20. These electrical devices 72 may include, but are not limited to, motion sensors 74, light sensors 76, timers 78, thermometers 80, remote devices 82, and devices connected to the internet 84. Ambient light sensors may be of any variety including, but not limited to, photodiodes, phototransistors, charge coupled devices, CMOS imagers, or the like. Communication connections may be provided between each electrical device(s) 72 and each luminaire 22, each control module 24, and other electrical devices 72.

Control for all of the devices shown in FIG. 4 may originate from the same control module 24 and may be manipulated according to the same control input 34 to the control module. In one embodiment, the digital data is provided to each electrical device 72 as well as each luminaire 22. However, alternative embodiments are contemplated wherein additional control techniques and hardware may be used to develop communication with the various electrical devices 72.

Control of parameters by the digital data is contemplated with respect to a single light source, groups of light sources, strings of light sources, groups of strings of light sources, luminaire(s), groups of luminaires, or any combination thereof. Referring once again to FIG. 1, varying parameters may effect change upon only a single LED 27, a single string 40 of LEDs, or a plurality of strings. Still further with reference to FIGS. 3 and 4, varying parameters may effect change upon one or more luminaires 22, one or more electrical devices 72, or any combination of electrical devices (s) 72 and luminaire(s) 22.

Furthermore, the digital data may control any or all of the parameters necessary for the creation and control of scenes, rooms, and/or zones with any combination of light source(s) 26 and luminaire(s) 22. While frequently, the on/off status of one or more light sources 26 is used to create scene, room, or zone lighting, some embodiments contemplate utilizing one or more other controllable parameters of light source(s) 26 to increase customizability of the scene, room, or zone lighting. For example, one could control CCT and dimming level of light source(s). Persons having skill in the art will be able to readily identify further parameters of light source operation capable of being controlled by digital data impressed on the analog dimming command signal.

Figure 5A:
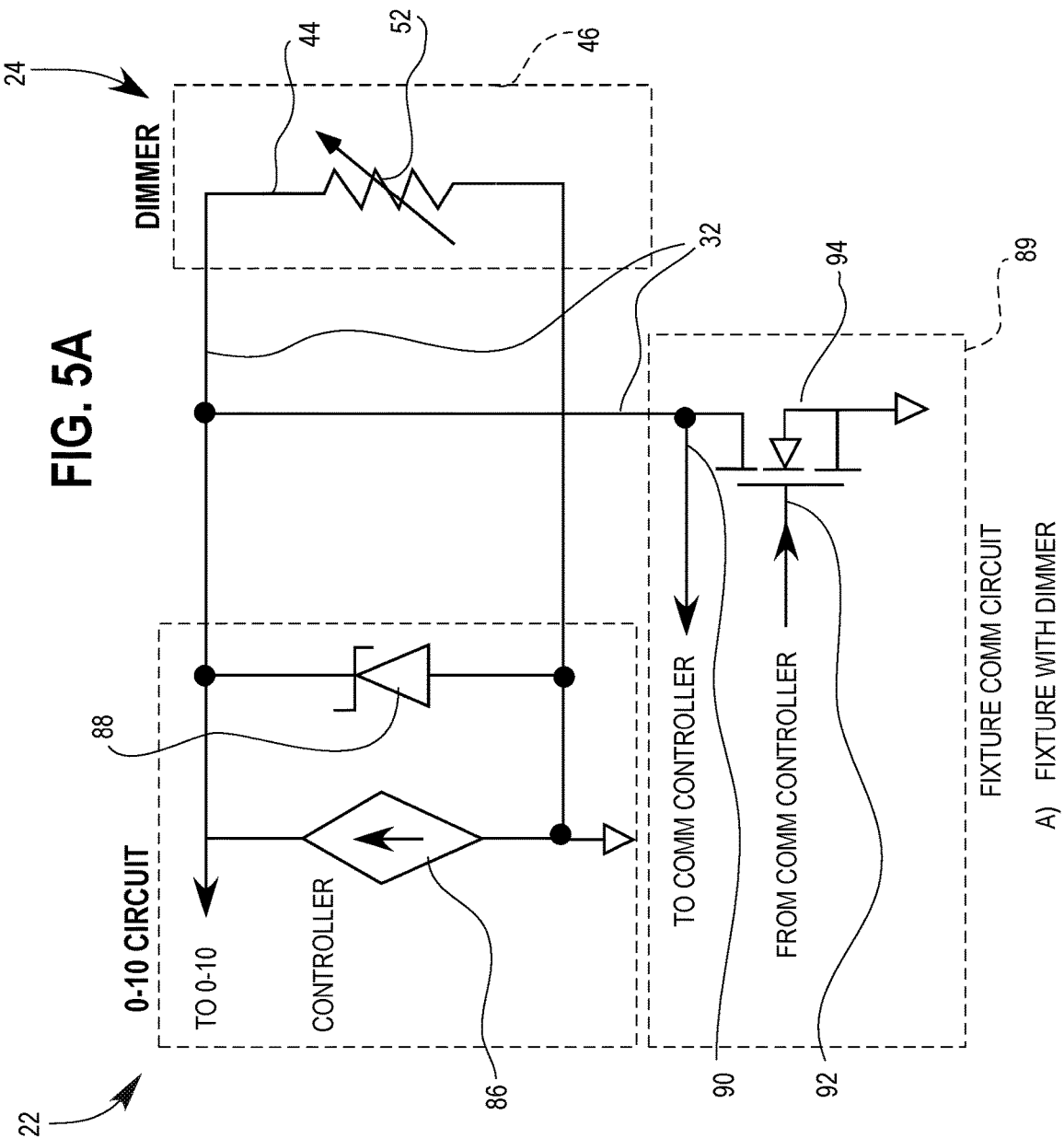
FIG. 5A is combined block and schematic diagram of an alternative embodiment of a lighting system.
Figure 5B:
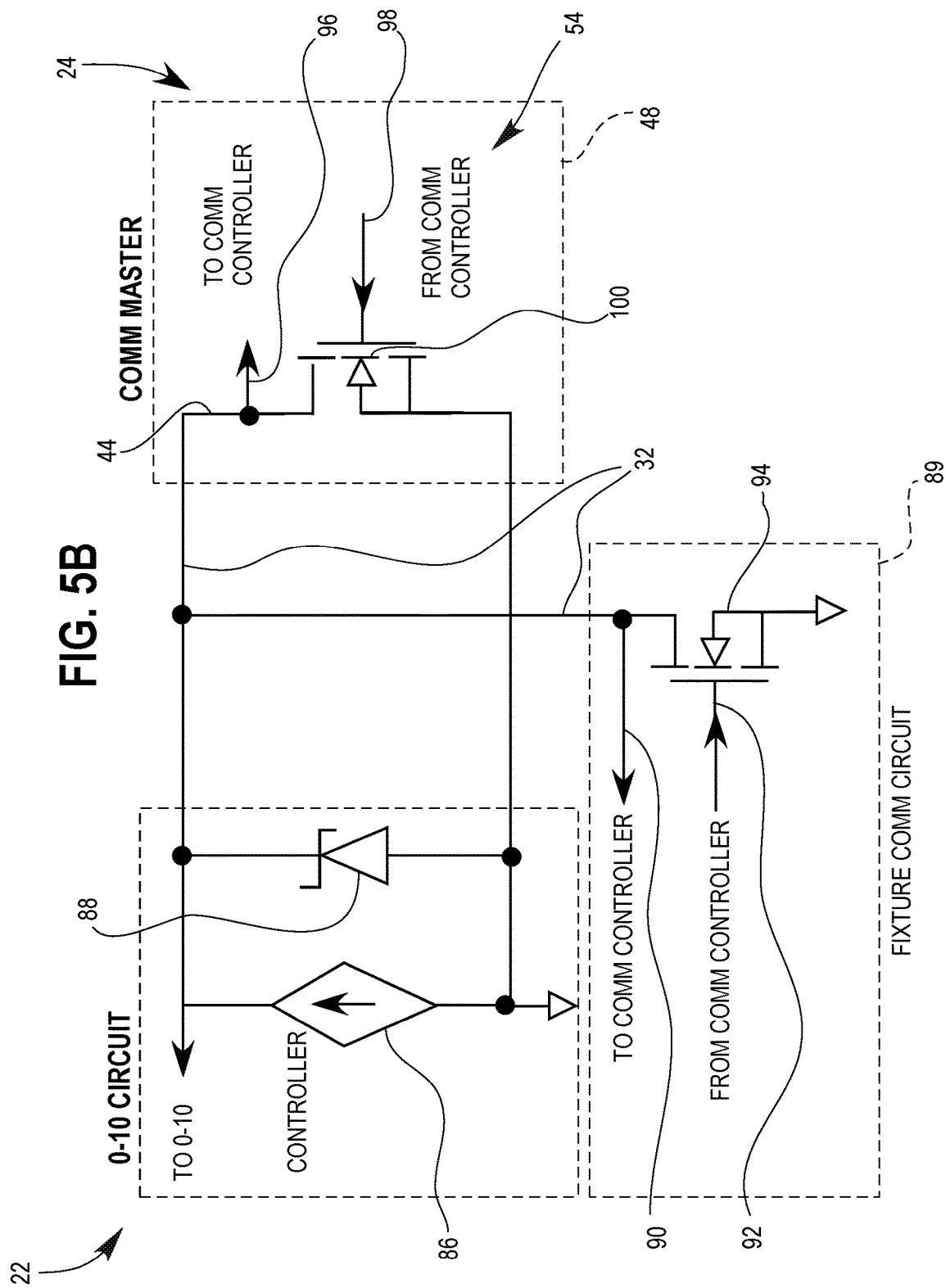
FIG. 5B is combined block and schematic diagram of an alternative embodiment of a lighting system.

The alternative embodiments shown in FIGS. 5A and 5B depict a control circuit for modulating an analog dimming command signal including a 0-10V dimming line 44 that can double as a digital communications bus. While the alternative embodiments shown in FIGS. 5A and 5B operate in a similar fashion to the embodiment described with reference to FIG. 1, such embodiments may include different components for implementing the IEC 0-10V analog lighting control protocol as well as different digital command circuitry 48 for injecting or impressing digital data onto the line 44 carrying the analog dimming command signal.

The luminaire control circuitry shown in FIG. 5A includes a constant current source 86 in parallel with a zener diode 88. This circuitry is responsive to the magnitude of the dimming command signal on line 32 within the determined control range to develop a constant current magnitude and a luminaire control voltage magnitude that cause the luminaire to operate at a commanded brightness level. The luminaire 22 shown in FIG. 5A further includes a communication module 89. The communication module 89 includes a wire 90 to a communication controller, such as the microcontroller 30 shown in FIG. 2, for detecting incoming digital data. The communication module 89 further includes a wire 92 from the communication controller to a field effect transistor (FET) 94 that operates to amplitude modulate and thereby develop the digital data on the line 32 connecting the luminaire 22 to the control module 24.

Still referring to the embodiment of FIG. 5A, the control module 24 includes dimming control circuitry 46 that develops the analog dimming command signal on the line 44 according to the above-described IEC 0-10V analog lighting control protocol. The dimming control circuitry 46 includes the variable resistor (i.e., potentiometer) 52, previously described with reference to FIG. 1, which receives the constant current magnitude and develops the dimming command signal in response to receipt of the constant current magnitude according to a setting of the variable resistor 52.

Referring now to FIG. 5B, the control module 24 is shown as further including or alternatively including digital command circuitry 48 for developing further digital data on the signal on the line 32 connecting the control module 24 to the luminaire 22. The digital command circuitry 48 may replace the variable resistor 52, in which case the IEC 0-10 V analog lighting control protocol may not be used. In an alternative embodiment, the digital command circuitry 48 may be controlled such that the FET 100 operates in linear mode and develops the analog dimming command signal on line 44 in a manner similar to the variable resistor 52. In a further alternative, the digital command circuitry 48 may be used together with the variable resistor 52, and the commands developed by both may control the luminaire 22. In the latter case, the luminaire 22 could be responsive to the digital command circuitry 48 and the variable resistor 52 on a time-multiplexed basis, or the digital commands developed by the digital command circuitry 48 may be impressed on the analog dimming signal developed by the variable resistor 52 in the fashion noted above (e.g., by amplitude modulation), in which case the digital commands developed by the digital command circuitry 48 may be time-multiplexed or otherwise coexist with the digital data developed by the communication module 89 on the line 32. The control module 24 shown in FIG. 5B includes a wire 96 coupled to a communication controller, such as the microcontroller 56 described with reference to FIGS. 1, 2, and 3. The control module 24 further includes a wire 98 coupled from the communication controller to another FET 100 that operates to amplitude modulate the signal on the line 32. This preferably results in binary encoded digital signals being impressed onto the signal on the line 32, although other modulation and/or encoding schemes may be used as should be evident to one of ordinary skill in the art. Just as with the previously described embodiment of FIG. 1, different modulation approaches may necessitate different modulation circuitry 54. The alternative embodiments shown in FIGS. 5A and 5B are not intended to be limiting but are discussed merely by way of example.

One suitable encoding/decoding scheme may be implemented as follows. The communications bus comprising the line 32 is an asynchronous, single-wire interface in which the high time of the signal determines its state as a zero or one. FIG. 6 shows a typical byte including a start bit 102 and data bits 104 following the start bit. Each data bit consists of a period of logic high followed by a period of logic low. The transition time ($t_{Trans}$) 107 from high to low must happen at one of two points (relative to the start time of the bit):

$$t_{Trans} = \frac{T_{Bit}}{3} \text{ or } t_{Trans} = \frac{2 \cdot T_{Bit}}{3}$$

Where $T_{Bit}$ is the total period of the data bit. A $t_{Trans}$ 107 of $T_{Bit}/3$ indicates a data value of zero where a $t_{Trans}$ 107 of $2*T_{Bit}/3$ indicates a data value of one, as illustrated by the bit timing diagrams 106 and 108 of FIGS. 7 and 7A, respectively.

A transmission is comprised of a command string from the commanding device (otherwise referred to as a master device) and a response string from the commanded device (otherwise referred to as a slave device). In one alternative embodiment, the commanding device may be the control module 24 and the commanded device may be the luminaire 22, however the roles of the devices may be reversed or occur simultaneously. Both command and response strings may have 1, 2, or 3 data bytes, depending on the type of command and the parameter that is being referenced. All commands are either read commands or write commands. Each valid command accesses a unique parameter in the luminaire microcontroller 30 shown in FIG. 2. The start bit 102 of each transmitted command byte 109 indicates whether a read command (logic 0) or write command (logic 1) is being requested, and the next seven data bits 104 of each byte indicate the parameter that is being accessed. In the event that a write command is being requested, either one or two data bytes 110, as shown in FIGS. 10, 11, 12B, 12C, and 13B, follow. Such bits contain the information to be written to the appropriate parameter or some other information relevant to the command. (The echo byte indicated in the FIGS. is discussed below.)

A read command is used to read the value stored in a storage location assigned to a parameter. This command is always issued as a single byte. Specifically, no data is associated with a read command. The response from the commanded device will be one of three types indicated in Table 1 below.

TABLE 1

Valid Responses to a Read Command

| Response type | Condition | Number of Response Bytes |
|---|---|---|
| NACK | Issued when the requested parameter is write only | 1 |
| | Issued when the requested parameter is read protected | |
| Parameter not supported | Issued when parameter is not implemented in code | 1 |
| Echo/Data | Issued when command is valid and parameter is supported | 2 or 3 |

A write command is used to record a new value into a parameter storage location. This command is always issued as either a single command byte 109 with one data byte 110 following the command byte, or as a single command byte 109 with two data bytes 110 following the command byte. The number of data bytes 110 is dependent on the parameter storage location to which the data is being written. The response from the commanded device may be one of the types indicated in Table 2 below:

TABLE 2

Valid Responses to a Write Command

| Response type | Condition | Number of Response Bytes |
|---|---|---|
| ACK | Issued when the requested parameter is write protected, and the correct protect key is provided | 1 |
| NACK | Issued when the requested parameter is read only | 1 |
| | Issued when the requested parameter is write protected, and the protect key is incorrect | |
| | Issued when the requested parameter is locked | |
| | Issued when the number of data bytes provided does not match the expected bytes for the requested parameter | |
| Parameter not supported | Issued when parameter is not implemented in code | 1 |
| Echo/Data | Issued when command is valid and parameter is supported | 2 or 3 |

The first byte of a response string is either a repetition of the parameter address requested by the commanding device or a special byte. The start bit 102 of the first byte in the response indicates the type of response being sent. A zero in this position indicates that the response is a confirmation of the parameter address followed by data, and a one in this position indicates that the response is a special byte.

Tables 3 and 4 list example valid commands and example valid responses for potential use in digital communication.

TABLE 3

Valid Commands

| Command (Binary) | Description |
|---|---|
| 0AAAAAA | Read from parameter AAAAAAA (0-127) |
| 1AAAAAA | Write to parameter AAAAAAA (0-127) |

TABLE 4

Valid Responses

| Command (Binary) | Description |
| --- | --- |
| 0AAAAAAA | Contents of parameter AAAAAAA to follow (0-127) |
| 10000000 | NACK (Not acknowledged/refused) |
| 10000001 | Parameter not supported |
| 11111111 | ACK (Acknowledge) |
| 110XXXXX | Not implemented |
| 1110XXXX | Not implemented |
| 11110XXX | Not implemented |
| 111110XX | Not implemented |
| 1111110 | Not implemented |
| 11111110 | Not implemented |
| 101XXXXX | Not implemented |
| 1001XXXX | Not implemented |
| 10001XXX | Not implemented |
| 100001XX | Not implemented |
| 1000001X | Not implemented |

FIG. 8 shows a data hold protocol used by the commanded device. After the commanded device receives the command byte 109 or data byte 110, the commanded device may need additional time during which to interpret the transmitted byte. The commanded device may ask the commanding device to wait before sending a next byte using the data hold protocol. To request the additional time the commanded device simply holds the line 32 low, which disables any other bits from being transmitted. On-off sequence 111 depicts the commanded device turning FET 94 on and off. On-off sequence 105 depicts the commanding device turning FET 100 on and off. Sequence 113 depicts the resulting signal on line 32.

An echo response is an example valid response, identified in Tables 1 and 2, to either a read or write command. The echo response is issued when data is written to or read from a parameter storage location. In the case of a read command the parameter address is repeated in conjunction with transmission of the data contained therein, whereas in the case of a write command both the parameter address and the data written are repeated. FIG. 9 is a diagram of a response to a typical read request. Echo bytes 112 and repeated data bytes 110 are used by the commanding device to verify that the transmission was received properly and that no bits were corrupted. In the case of a read command, the entire command byte 109 is a single byte. The commanded device verifies that the correct parameter was received by repeating the parameter storage location address (i.e., by transmitting the echo byte 112) and then issuing either one or two following data bytes 110.

FIG. 10 is a diagram of a write command and response. A write command includes both a command byte 109 and either one or two data bytes 110, depending on the parameter being written. The response includes the echo byte 112. The echo byte 112 starts with a binary zero as opposed to repeating the write command, which starts with a binary one. The echo byte 112 is followed by the same one or two data bytes 110 received in the write command. The repetition of the parameter address and data byte(s) 110 may be used by the commanding device to verify that the correct information was received by the commanded device.

FIG. 11 shows a write command where the write address is a protected byte followed by a special byte response. In FIG. 11, the special byte transmitted is an ACK byte 114. The ACK byte 114 indicates "acknowledged" and is a valid response to some write commands. In the cases where it is used, the ACK byte 114 response verifies that the write command was received successfully. An ACK byte 114 is only used to respond to special parameters that are write-only and protected. These special write command bytes 109 are followed by two data bytes, but the data is not written to a parameter storage location. Instead the two bytes are used as a protect key or password to allow the write command to be called. If the protect key bytes 116 correspond to the protect key, then the command is successful and an ACK byte 114 is issued as a response.

FIG. 12A shows a write command byte where the write address is a protected parameter followed by a NACK byte 118. A NACK byte 118 indicates that the protect key was refused or "not acknowledged." A NACK byte 118 is a valid response to some write commands and some read commands. The NACK byte 118 response verifies that the command was received, but also indicates that the commanded device has declined to perform the requested action. A NACK byte 118 may indicate any of the following conditions shown in FIGS. 12A-12C: a read request was made to a write-only parameter (sequence 120), a read request was made to a read-protected parameter, a write request was made to a read-only parameter (sequence 122), a write request was made to a protected parameter but an incorrect protect key was given (sequence 124), a write request was made to a locked parameter, and an incorrect number of bytes were written to a writable parameter.

Figure 13A:
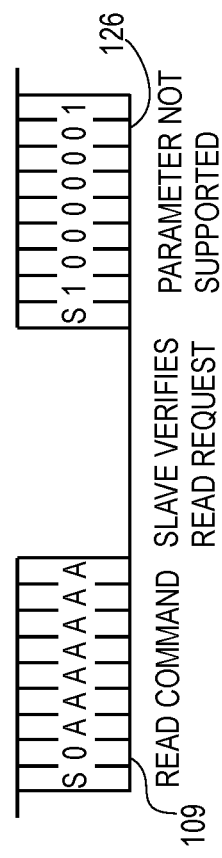
FIG. 13A is a diagram of exemplary read command with a response thereto indicating a parameter of the read command is not supported.
Figure 13B:
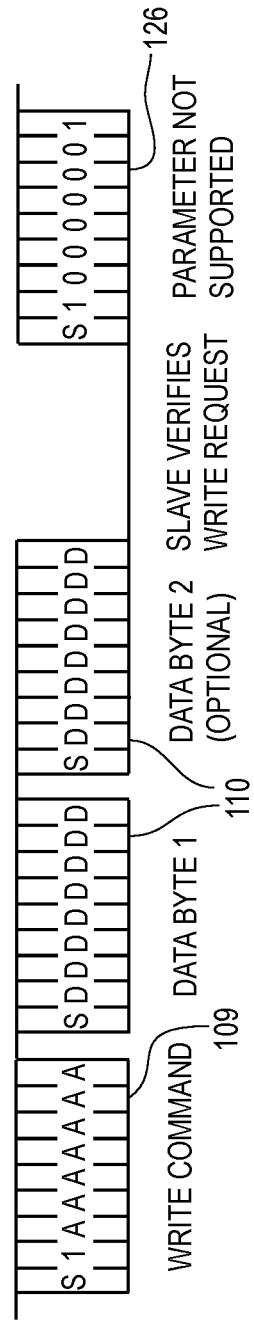
FIG. 13B is a diagram of exemplary write command with a response thereto indicating a parameter of the write command is not supported.

FIG. 13A and FIG. 13B show a parameter-not-supported response 126 for both read and write commands. The parameter-not-supported response 126 is used to indicate to the commanding device that the requested parameter is not implemented in the version of firmware loaded on the commanded device. Some parameters are implemented in the commanded device, but many are used only in some scenarios and may or may not be implemented at the discretion of the programmer.

Table 5 includes a variety of example parameters associated with the control circuit for modulating an analog dimming command signal shown in FIGS. 5A-13 and the non-limiting, illustrative encoding/decoding scheme described above.

TABLE 5

Electrical Parameters

| Symbol | Description | Min | Nom | Max | Unit |
| --- | --- | --- | --- | --- | --- |
| $T_{Bit}$ | Period of a single bit | 25 | | 125 | µs |
| $T_{Zero}$ | $V_{high}$ time for a logic zero | $1/4 * T_{Bit}$ | $1/3 * T_{Bit}$ | $3/8 * T_{Bit}$ | |
| $T_{One}$ | $V_{high}$ time for a logic one | $5/8 * T_{Bit}$ | $2/3 * T_{Bit}$ | $3/4 * T_{Bit}$ | |
| $T_{Mid}$ | Time between transmitted bytes | $2 * T_{Bit}$ | | | |
| $T_{Delay}$ | Time between end of data hold and beginning of response | | | 250 | µs |
| $V_{High}$ | Voltage during a high state | 9 | 10 | 16 | V |

TABLE 5-continued

Electrical Parameters

| Symbol | Description | Min | Nom | Max | Unit |
|---|---|---|---|---|---|
| $V_{Low}$ | Voltage during a low state | | 0 | 1 | V |
| $I_{0-10}$ | 0-10 V Signal Current Source | 150 | | 250 | µA |

The embodiment(s) detailed above may be combined, in full or in part, with any alternative embodiment(s) described.

INDUSTRIAL APPLICABILITY

In summary, the 0-10V analog lighting control protocol is effective to control the dimming of LED luminaires. However, modern luminaires have increased capabilities and a sizeable customer demographic demands significantly more control over LED lighting systems than can be afforded by the 0-10V analog lighting control protocol. The present embodiments permit sophisticated control of a wide range of parameters without introducing significant complexity and cost.

The present embodiments are also useful to communicate digitally with luminaire microcontrollers to permit programming/re-programming of these microcontrollers either in the field or in the factory over an already-existing physical communication line or a wireless communication line. The embodiments described herein may also be used as a retrofit field upgrade to luminaire controls that are already in use. It is advantageous to utilize the hardware of existing control protocols and, simultaneously, not interfere with the control functions of these existing controls. Thus, the present embodiments are useful for expanding control while supporting legacy control protocols.

The present control circuit is usable with any kind of luminaire, particularly a luminaire incorporating at least one LED therein, and may be used to control an individual luminaire or a network of such luminaires. At least one luminaire, whether in a network or not, is responsive to first and second signal components of a command signal developed by the control circuit wherein the first signal component comprises the IEC 0-10 volt analog lighting control. The second signal component may comprise digital data and may command one or more of color temperature, to display scenes, rooms, or zones, to implement scheduled commands, to control displayed hue, to cause flashing and/or steady illumination of one or more luminaires of the network or another network, to coordinate operation of at least two luminaires, whether of the same or different networks (or even not forming a part of a network), to cause at least one luminaire to turn on upon sensing a condition, such as motion, light, or the like, and/or to enable communication between luminaires and/or communication between one or more luminaires and one or more other devices whether of the same or different networks, or not of a network. The luminaire(s) may be of the indoor and/or outdoor types, and/or may be of any power output, efficacy, shape, size, form factor, etc.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. An LED lighting device, comprising:
   at least one LED selectively energizable to develop light; and
   a control circuit coupled to the at least one LED and configured to develop a command signal comprising first and second command signal components for controlling the at least one LED to cause the at least one LED to develop light comprising a desired brightness in response to the first command signal component and a further desired parameter magnitude other than desired brightness in response to the second command signal component;
   wherein the first signal component comprises an IEC 0-10 volt analog lighting control;
   wherein the second command signal component comprises digital data and is impressed upon the first command signal component.

2. The LED lighting device of claim 1, wherein the at least one LED comprises a plurality of LEDs in a luminaire.

3. The LED lighting device of claim 1, wherein the second signal component is configured to command one or more of color temperature, to display scenes, rooms, or zones, to implement scheduled commands, to control displayed hue, to cause flashing and/or steady illumination of one or more luminaires, to coordinate operation of at least two luminaires, to cause at least one luminaire to turn on upon sensing a condition, and/or to enable communication between luminaires and/or communication between one or more luminaires and one or more other devices.

4. The LED lighting device of claim 1, wherein the control circuit is further configured to encode the second command signal component on the first command signal component.

5. The LED lighting device of claim 4, wherein:
   the at least one LED comprises a plurality of LEDs in a luminaire; and the luminaire is configured to decode the second command signal component from the first command signal.

6. A lighting network, comprising:
a plurality of interconnected luminaires; and
a control circuit coupled to the plurality of interconnected luminaires and configured to develop a command signal comprising first and second command signal components for controlling the plurality of interconnected luminaires;
wherein the control circuit is further configured to cause at least one of the luminaires to:
develop light comprising a desired brightness in response to receipt of the first command signal component by the at least one luminaire; and
operate according to a further desired parameter other than desired brightness in response to the second command signal component;
wherein the first signal component comprises an IEC 0-10 volt analog lighting control;
wherein a first luminaire of the plurality of interconnected luminaires comprises at least one LED and a second luminaire of the plurality of interconnected luminaires comprises a lighting element other than an LED.

7. The lighting network of claim 6, wherein each luminaire comprises at least one LED.

8. The lighting network of claim 7, wherein the second signal component comprises digital data.

9. The lighting network of claim 8, wherein the second signal component is configured to command one or more of color temperature, to display scenes, rooms, or zones, to implement scheduled commands, to control displayed hue, to cause flashing and/or steady illumination of one or more luminaires of the network, to coordinate operation of at least two luminaires of the network, to cause at least one luminaire of the network to turn on upon sensing a condition, and/or to enable communication between luminaires of the network and/or communication between one or more luminaires of the network and one or more other devices.

10. The lighting network of claim 6, wherein the control circuit is further configured to cause the first and second luminaires to develop light comprising the desired brightness in response to receipt of the first command signal component by the first and second luminaires.

11. The lighting network of claim 10, wherein the control circuit is further configured to cause the first luminaire to operate according to the further desired parameter other than desired brightness in response to the second command signal component.

12. The lighting network of claim 6, wherein a first luminaire of the plurality of interconnected luminaires is configured to:
receive at least one of the first command signal component and the second command signal component; and
transmit the at least one of the first command signal component and the second command signal component to a second luminaire of the plurality of interconnected luminaires.

13. The lighting network of claim 12, wherein each of the plurality of interconnected luminaires is configured to transmit both the first command signal component and the second command signal component from one to the next thereof.

14. A lighting network, comprising:
one or more lighting elements;
a control circuit coupled to the one or more lighting elements and configured to develop a dimming command signal and a second command signal; and
one or more driver circuits associated with the one or more lighting elements;
wherein the control circuit is further configured to transmit the dimming command signal to the one or more driver circuits;
wherein the one or more driver circuits are configured to:
operate the corresponding one or more lighting elements at a brightness according to the dimming command signal; and
receive the second command signal encoded with the dimming command signal;
wherein the one or more lighting elements comprise at least one LED element and at least one lighting element other than an LED element.

15. The lighting network of claim 14, wherein each of the one or more driver circuits corresponding to the at least one LED element is configured to decode the second command signal from the dimming command signal.

16. The lighting network of claim 14, wherein the one or more driver circuits are further configured to receive the second command signal and the dimming command signal simultaneously.

17. A lighting network, comprising:
a plurality of interconnected luminaires; and
a control circuit coupled to the plurality of interconnected luminaires and configured to develop a command signal comprising first and second command signal components for controlling the plurality of interconnected luminaires;
wherein the control circuit is further configured to cause at least one of the luminaires to:
develop light comprising a desired brightness in response to receipt of the first command signal component by the at least one luminaire: and
operate according to a further desired parameter other than desired brightness in response to the second command signal component;
wherein the first signal component comprises an IEC 0-10 volt analog lighting control;
wherein a first luminaire of the plurality of interconnected luminaires is configured to:
receive at least one of the first command signal component and the second command signal component; and
transmit the at least one of the first command signal component and the second command signal component to a second luminaire of the plurality of interconnected luminaires.

18. A lighting network, comprising:
one or more lighting elements;
a control circuit coupled to the one or more lighting elements and configured to develop a dimming command signal and a second command signal; and
one or more driver circuits associated with the one or more lighting elements;
wherein the control circuit is further configured to transmit the dimming command signal to the one or more driver circuits;
wherein the one or more driver circuits are configured to:
operate the corresponding one or more lighting elements at a brightness according to the dimming command signal;
receive the second command signal encoded with the dimming command signal; and receive the second command signal and the dimming command signal simultaneously.

\* \* \* \* \*